United States Patent [19]

Ohashi et al.

[11] Patent Number: 4,922,419

[45] Date of Patent: May 1, 1990

[54] SYSTEM FOR PERFORMING BANKING TRANSACTIONS

[75] Inventors: Kunio Ohashi; Yoshihiro Fukutani, both of Kyoto, Japan

[73] Assignee: Omron Tateisi Electronics Co., Kyoto, Japan

[21] Appl. No.: 507,913

[22] Filed: Jun. 27, 1983

Related U.S. Application Data

[63] Continuation-in-part of Ser. No. 210,588, Nov. 26, 1980, abandoned.

[51] Int. Cl.[5] ............................................. G06F 15/30
[52] U.S. Cl. ..................................... 364/408; 235/379
[58] Field of Search ................ 364/408, 188; 340/712, 340/716, 721, 725, 825.33; 371/29; 235/382, 380, 381, 379; 273/DIG. 28; 434/307, 323, 334, 219, 118

[56] References Cited

U.S. PATENT DOCUMENTS

| | | | |
|---|---|---|---|
| Re. 30,773 | 10/1981 | Glaser et al. | 235/381 X |
| 3,158,317 | 11/1964 | Alexander | 340/712 X |
| 3,537,096 | 10/1970 | Hatfield | 340/725 |
| 3,544,833 | 12/1970 | Miura et al. | 340/725 |
| 3,662,374 | 5/1972 | Harrison, III et al. | 340/725 |
| 3,876,864 | 4/1975 | Clark et al. | 235/379 |
| 3,943,335 | 3/1976 | Kinker et al. | 235/379 |
| 4,045,789 | 8/1977 | Bristow | 340/725 |
| 4,134,537 | 1/1979 | Glaser et al. | 235/379 |
| 4,165,890 | 8/1979 | Leff | 283/7 |
| 4,224,615 | 9/1980 | Penz | 340/712 |
| 4,251,816 | 2/1981 | Eppley | 340/747 |
| 4,310,839 | 1/1982 | Schwerdt | 340/712 |
| 4,333,092 | 6/1982 | Field | 340/378.2 |
| 4,360,345 | 11/1982 | Hon | 434/265 X |
| 4,395,236 | 7/1983 | Gotthold | 434/219 |

FOREIGN PATENT DOCUMENTS

| | | | |
|---|---|---|---|
| 54-17466 | 8/1980 | Japan | 364/408 |
| 54-17467 | 8/1980 | Japan | 364/408 |
| 56-82971 | 7/1981 | Japan | 364/408 |
| 2083259 | 3/1982 | United Kingdom | 364/401 |

OTHER PUBLICATIONS

Advertisement, Time Magazine, Oct. 30, 1972, "The Blackboard is Obsolete".
Play Meter, Dec. 1980, "Coin-Operated Instructive Games" by Steven N. Czetli, pp. 113-119.
Exidy "Bandido"(advertisement), Apr. 15, 1980.
VW Owner's Manual-1969.

Primary Examiner—Raulfe B. Zache
Attorney, Agent, or Firm—Stevens, Davis, Miller & Mosher

[57] ABSTRACT

A system for performing the desired transaction when the customer follows a specified procedure comprising a sequence of steps includes an electronic visual display unit for displaying a message and a graphic illustration at the same time, and a plurality of functionally operative physically manipulative function units arranged around the display unit. The physical operations are performed by the customer in a sequence of steps, and some of the function units serve different functions for different steps. The display unit displays stepwise, immediately before each of the steps is performed by the customer, an instruction comprising the combination of a procedure specifying textual message describing the procedure to be followed by the customer and a procedure specifying graphic illustration pictorially depicting the physical enactment of the procedure in corresponding relation to the message. In a step in which a function button is to be operated by the customer, the display unit also shows a term indicating the function of the button at a location adjacent and corresponding to the button to be operated and a button frame surrounding the term at least at two sides thereof to indicate the location of the button corresponding to the term.

4 Claims, 26 Drawing Sheets

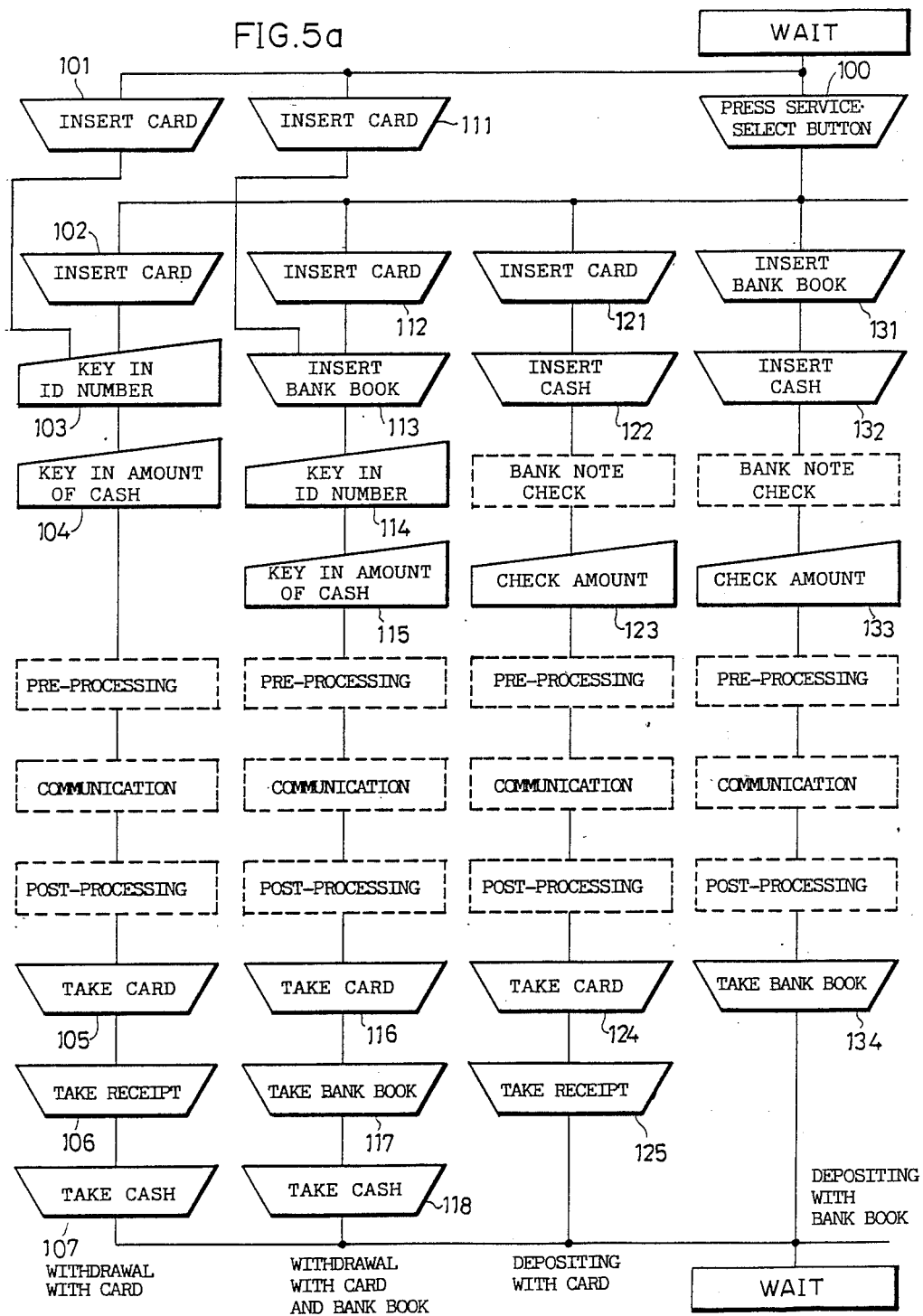

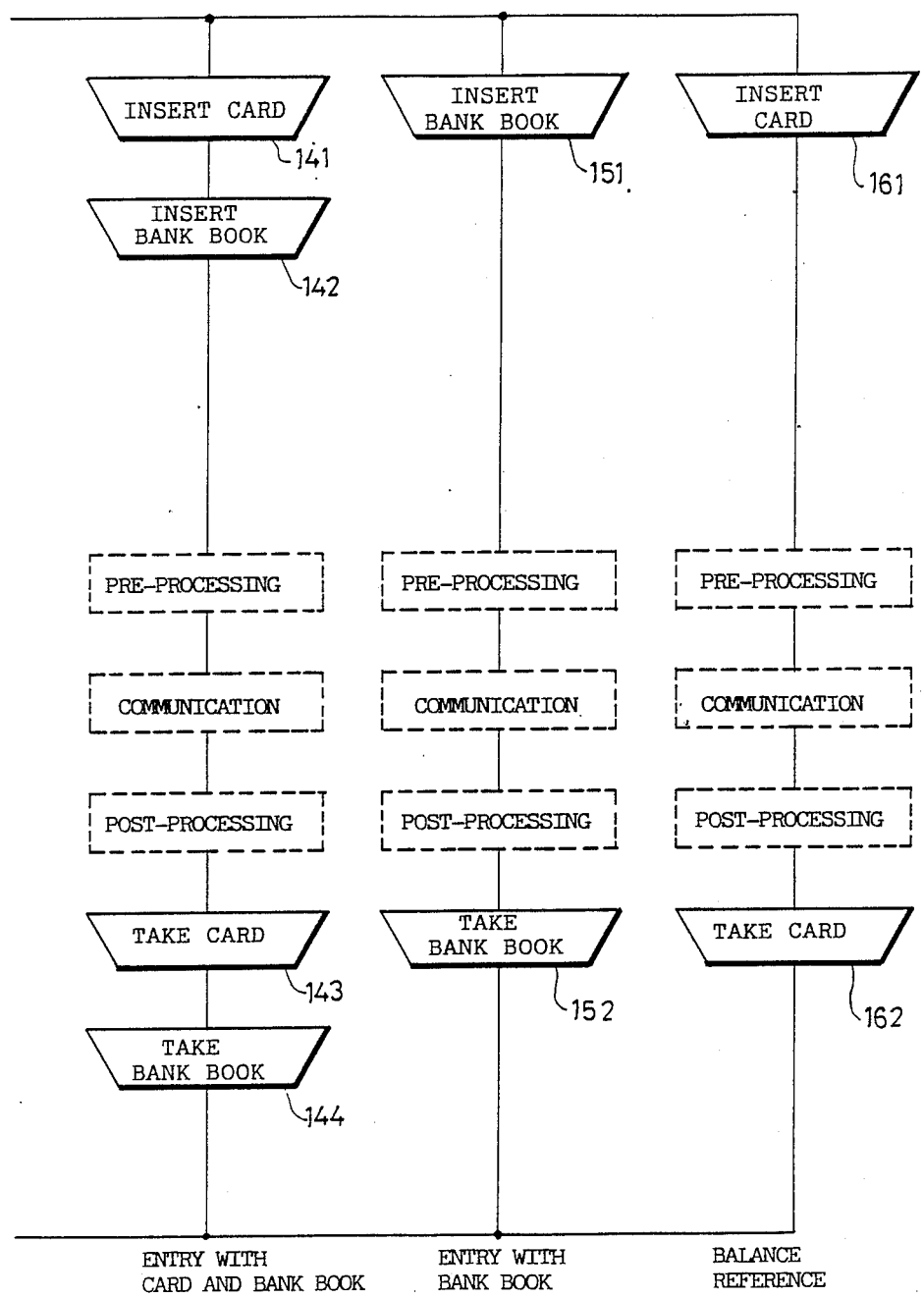

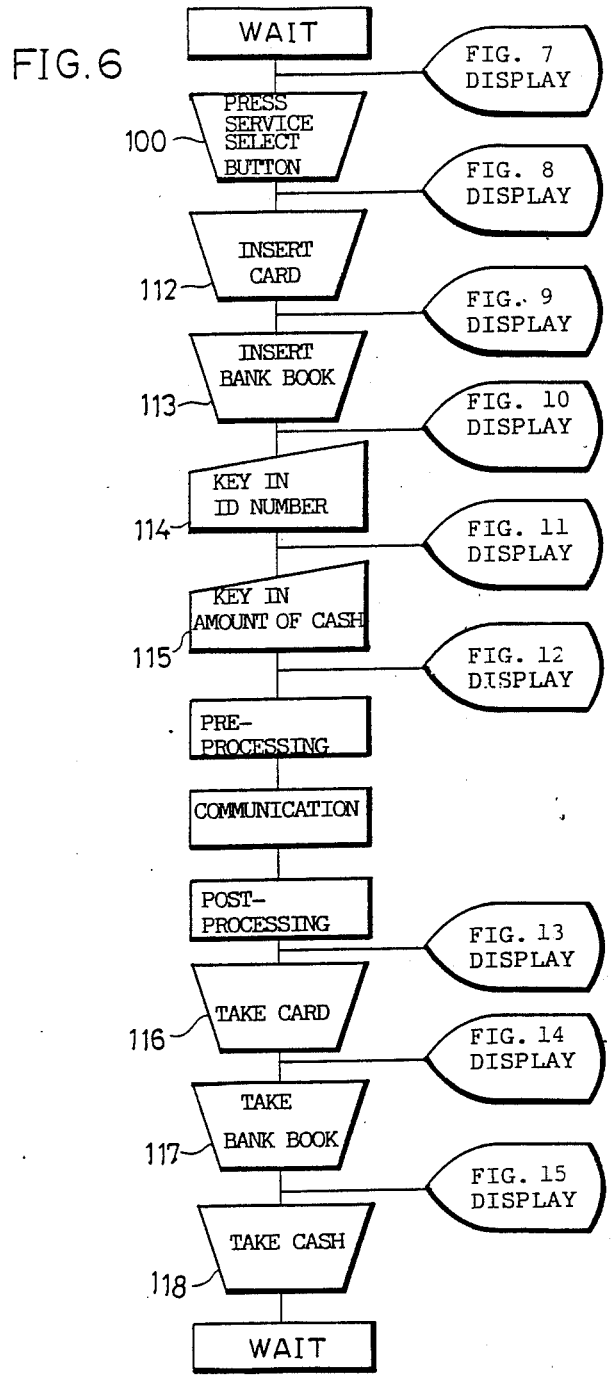

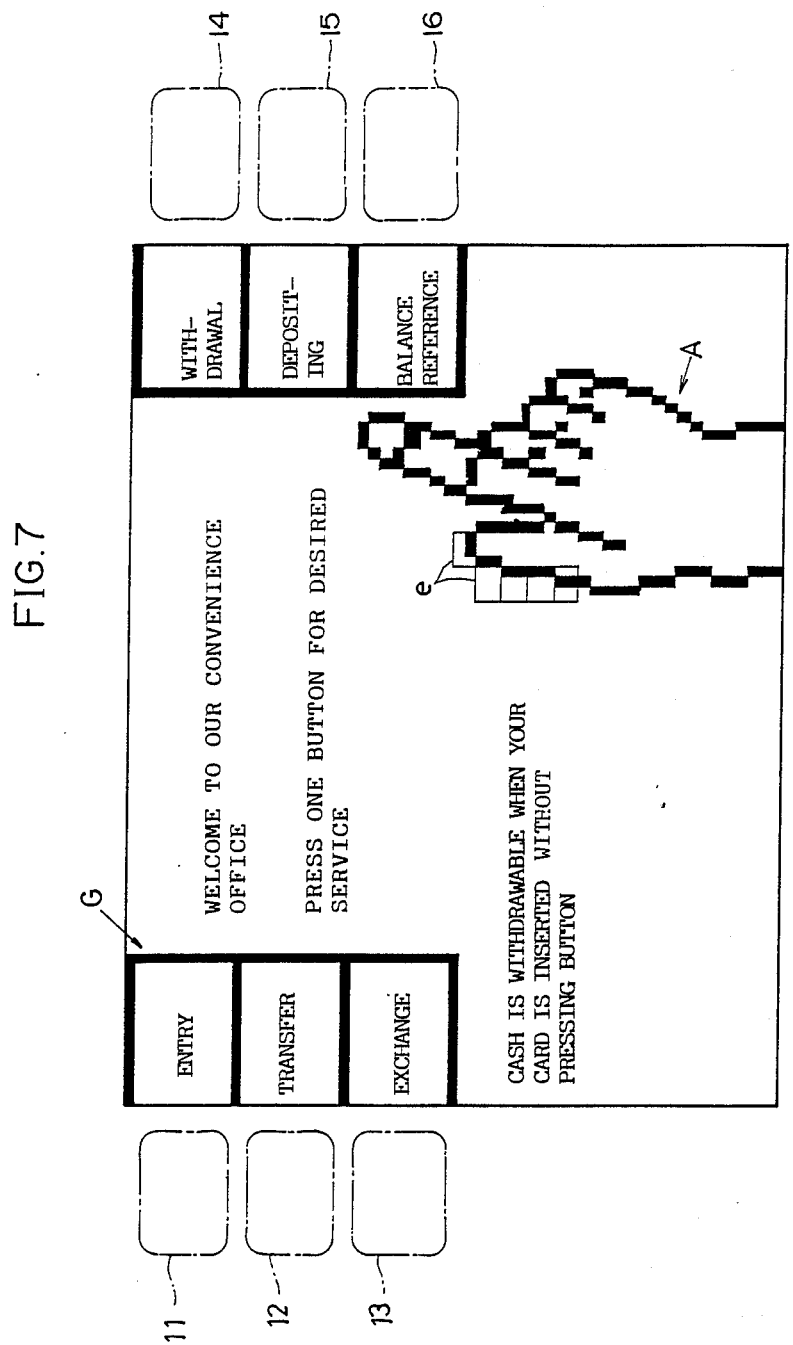

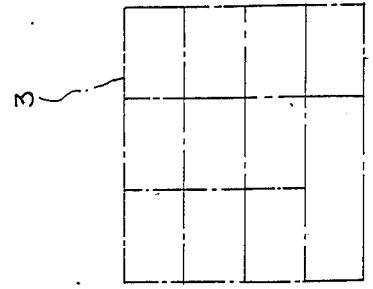
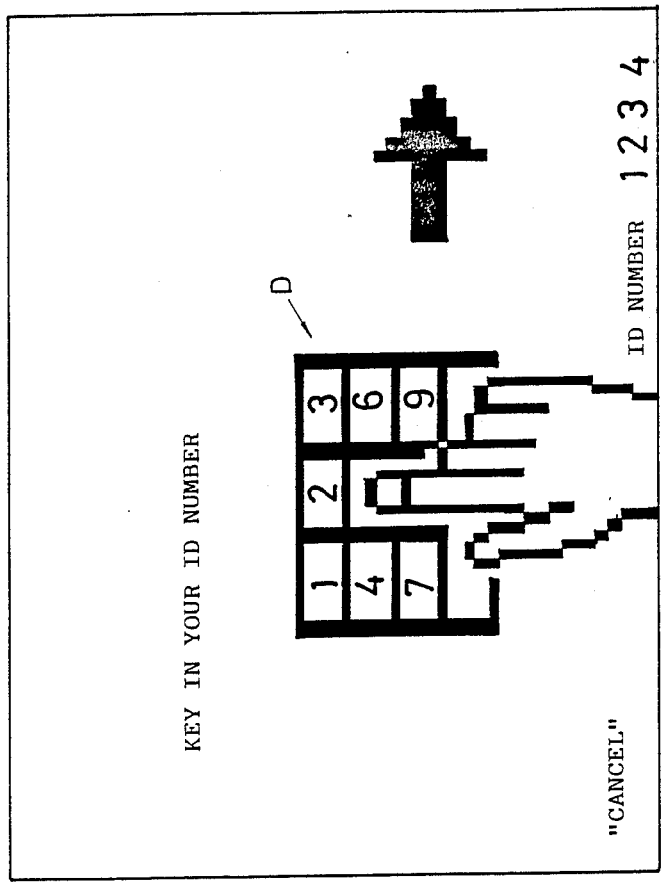
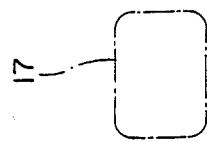
FIG.10

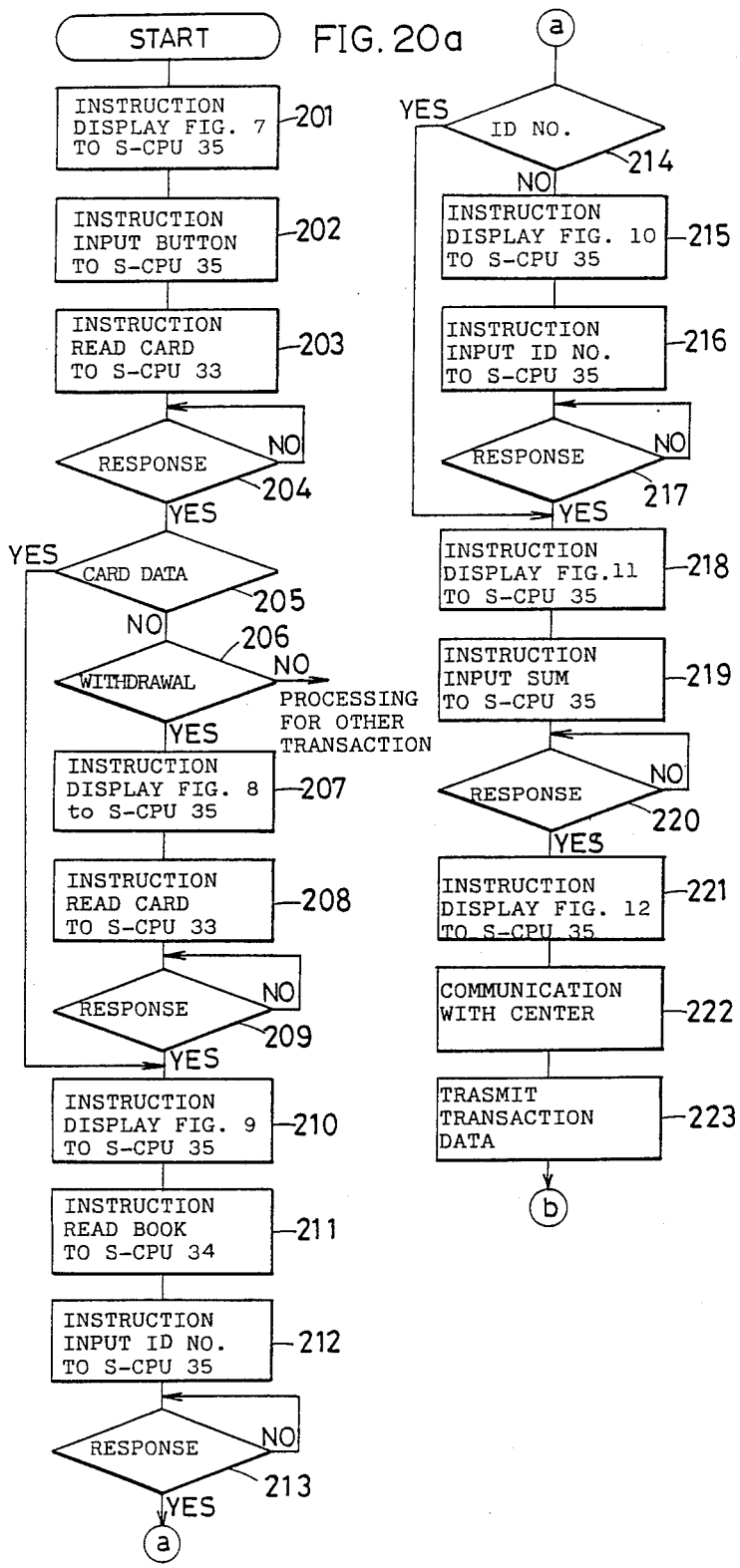

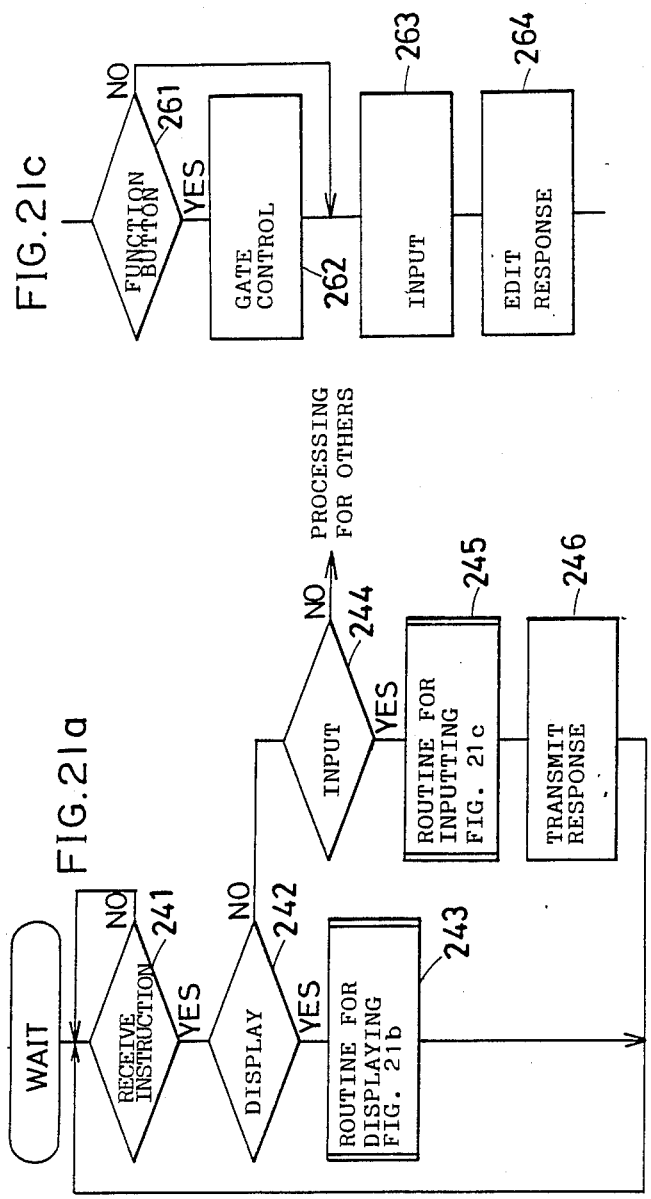

SYSTEM FOR PERFORMING BANKING TRANSACTIONS

This application is continuation-in-part of application Ser. No. 210,588 filed Nov. 26, 1980, now abandoned.

BACKGROUND OF THE INVENTION

This invention relates to a banking transaction performing system which includes an input unit to be operated by the customer and which enables the customer to perform any desired one of a plurality of banking transactions, such as depositing, cash dispensing, balance reference, bank book entry, funds transfer and cash exchanging, by following a specified procedure comprising a plurality of steps in sequence to be performed on the input unit.

DESCRIPTION OF THE PRIOR ART

Such systems for performing transactions have a display unit for indicating the instructions to be followed by the customer and buttons or a keyboard for specifying or entering the functions or data desired by the customer. U.S. Pat. No. 4,134,537 discloses a transaction terminal provided with a video display and general-purpose function selector buttons located adjacent the video display. The video display shows a descriptive text giving the instructions to be executed by the customer, so that the customer must read the text and understand the instructions. However, reading the text to understand the instructions requires a considerable effort and an extended period of time if the customer is not familiar with the transaction terminal. Thus the performance of one transaction takes a relatively long period of time. The function selector buttons on the transaction terminal each serve several different functions, such that a certain button is used for specifying one kind of function in one step, whereas in another step the same button is used for a different kind of function such as giving the answer to a question presented on the video display. The function of such a prior art button or the instructions for pressing the button are indicated, in the particular step concerned, in a descriptive text on the video display, with an arrow directed from that text toward the corresponding button. However, since the instructions for the button are expressed only with the text, reading and understanding the text involves the same drawback as mentioned above even if the arrow is given. Although only the desired button may be illuminated, it is nonetheless cumbersome to understand the instructions by reading.

SUMMARY OF THE INVENTION

An object of the present invention is to provide a transaction performing system having a visual display unit for presenting not only a textual message specifying the procedure to be followed by the customer but also a graphic illustration visually pictorially depicting the physical enactment of the procedure corresponding to the message so that the customer can immediately understand the procedure without reading the message, the system thus being adapted to perform the desired transaction quickly without necessitating any cumbersome reading of a textual instruction.

Another object of the invention is to provide a system which graphically gives instructions for pressing a function button and also similarly indicates the function button to be pressed to assure a rapid and accurate transaction.

The system of this invention is adapted to perform the desired transaction when the customer follows a specified procedure comprising a sequence of steps and includes an electronic visual display unit for giving textual messages and graphic illustrations at the same time. Immediately before a particular procedure is followed by the customer, the display unit shows, step by step, instructions comprising the combination of a message descriptively specifying the procedure and an illustration graphically depicting the enactment of the procedure in corresponding relation to the message.

For confirmation, it is desired that the display unit show the data entered by the customer and also the information to be given by the system or control center to the customer.

Cathode-ray tube displays as well as plasma displays are useful as electronic visual display units.

The transaction performing system of this invention has a plurality of physically operative function units, including input/output units and function buttons, arranged around the display unit. These function buttons are depressed by the customer in some of the steps in sequence and serve different functions in different steps. Immediately before a particular procedure is to be followed by the customer, the display unit shows stepwise instructions indicative of the procedure. In the step in which a function button is to be depressed by the customer, the display unit also shows, at a location adjacent the button and corresponding thereto, a term indicating the function of the button and a button frame surrounding the term at least at two sides thereof and manifestly indicating the location of the identified button.

The contents of the procedure specifying messages, procedure specifying illustrations and function indicating terms change in accordance with the field in which the system is used and the kinds of transactions to be handled by the system.

The present invention will become more apparaent from the following description of the preferred embodiment shown in the accompanying drawings and embodying the invention for performing banking transactions.

BRIEF DESCRIPTION OF THE DRAWINGS

FIG. 5a and 5b are a flow chart showing the procedures to be followed by the customer for performing transactions with use of the system;

FIG. 6 is a flow chart showing a cash dispensing procedure with use of a card and a bank book to illustrate the relation between the steps to be followed by the customer and displays on a CRT;

FIGS. 7 to 18 show various examples of displays on the CRT; and

FIGS. 20a, 20b, 21a, 21b, 21c, 22, 23 and 24 are flow charts showing the steps of operation of the system of the present invention.

DESCRIPTION OF THE PREFERRED EMBODIMENT

Figure 1:
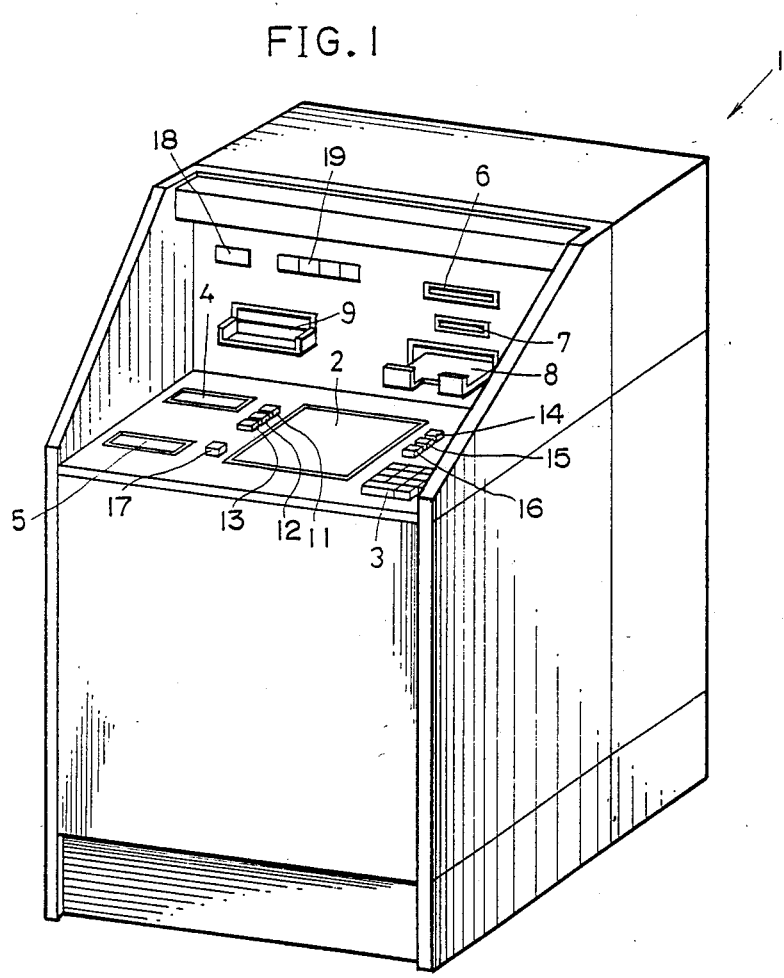
FIG. 1 is a perspective view showing the appearance of a banking transaction system.

FIG. 1 shows the appearance of a banking transaction system 1 for performing transactions, such as depositing, cash dispensing, balance reference, bank book entry, funds transfer and cash exchange. The system 1 may be housed in a console or terminal structure which has a forwardly projecting, horizontal customer operation panel provided with a cathode-ray tube display (Braun tube, hereinafter referred to as "CRT") 2 for showing instructions comprising procedure specifying textual messages and procedure specifying graphic illustrations in combination therewith, terms indicating the functions of function buttons 11 to 17, frames for manifestly indicating these buttons, amounts of cash to be dispensed, and other input data or information. The display screen of the CRT 2 is covered with protective glass. The function buttons 11 to 13, 17 and 14 to 16 are aligned vertically on the opposite sides of the CRT 2 at locations adjacent thereto. These function buttons 11 to 17 are used for entering information such the desired transaction selected, cancellation, confirmation, unit of money and selected kind of bank note. Disposed on the right side of the CRT 2 close to the front side of the panel is a ten-key keyboard 3 for keying in an ID number for identifying the customer and the amount of cash to be dispensed. The operation panel is further formed with input/output function units such as a cash inlet 4 for inserting bank notes and a cash return outlet 5 for returning bank notes. When bank notes are inserted for depositing but the transaction is cancelled before completion, the notes placed in are returned to the outlet 5. Preferably the function buttons 11 to 17 and keyboard 3 are made from pressure-sensitive electro-conductive rubber, whereby the buttons and keys can be made thinner, positioned closer to the CRT 2, and rendered easier to operate and more compact.

The system 1 has a vertical operation panel formed at the right-hand side thereof with additional input/output function units such as an inlet 6 for inserting a magnetic card having magnetically recorded therein data such as a personal code, relating to the customer eligible for banking transactions, an outlet 7 for delivering a receipt having printed thereon data of a transaction performed without using any bank book, and a cash outlet 8 for delivering the bank notes to be dispensed. On the left side, the vertical panel has another input unit, an inlet 9 for inserting a bank book, and an operation indicator 18 disposed above the bank book inlet 9 for indicating that the system 1 is in condition for transactions, and a service indicator 19 similarly disposed for indicating the kinds of transactions to be carried out.

Figure 2:
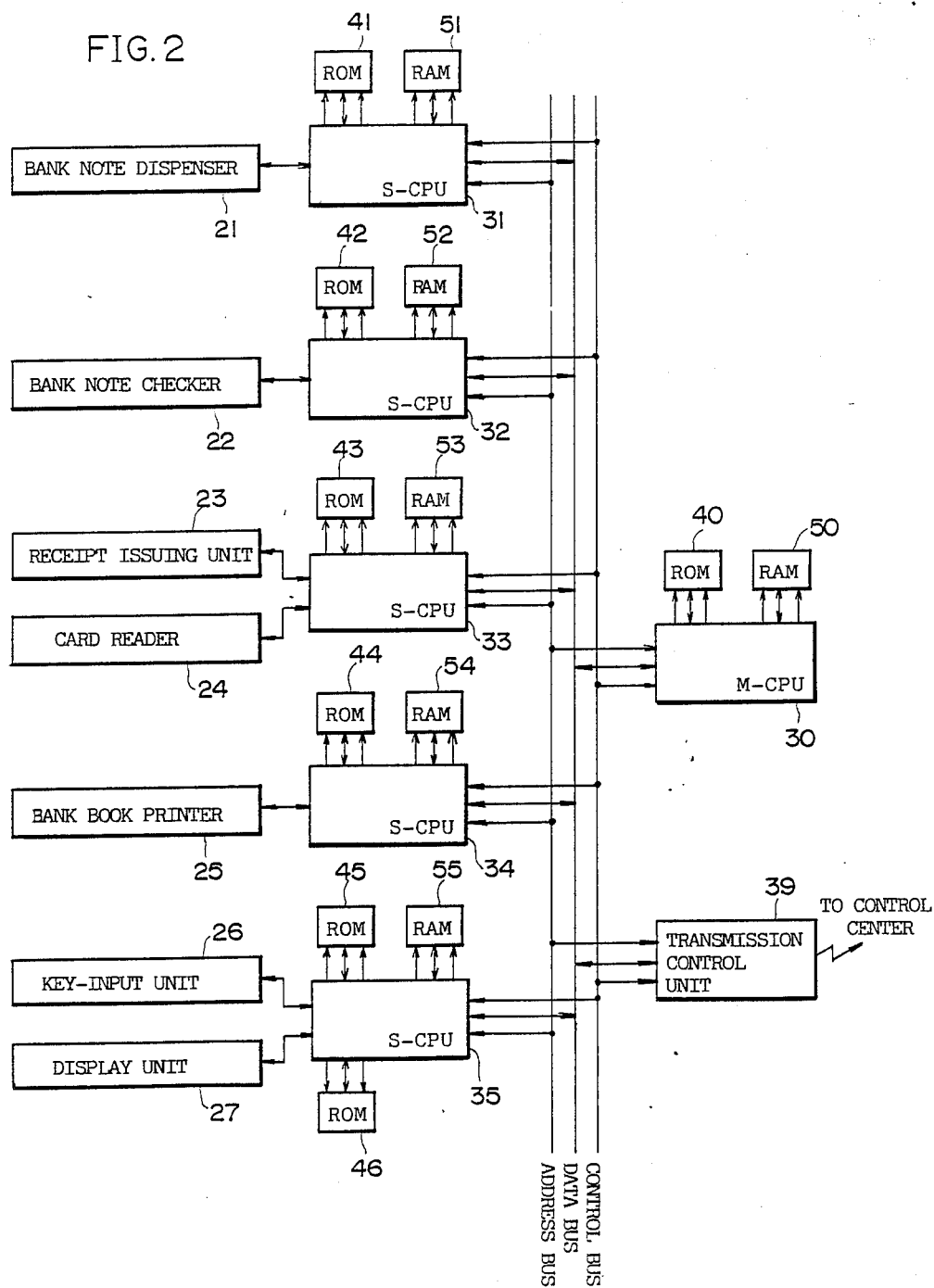
FIG. 2 is a block diagram showing the interior circuit construction of the system.

FIG. 2 schematically shows the interior construction of the banking transaction system 1. The system is provided as input/output units with a bank note dispenser 21 for counting and transporting bank notes in a sum specified for cash dispensing as well as for cash exchange and delivering the notes to the outlet 8 in response to a "confirm" signal from the function button 15 (see FIG. 17), a bank note checker 22 for verifying that the bank notes inserted into the cash inlet 4 are genuine and discriminating the kinds of the notes, a receipt issuing unit 23 for recording for the bank the data of each transaction, such as the kind of transaction, the amount or sum of cash dispensed or deposited, etc., and also for delivering a receipt to the customer, a magnetic card reader 24 disposed inside the card inlet 6 for reading the data magnetically recorded in the card, a bank book printer 25 for printing on the book the date of transaction, the amount of cash dispensed or deposited, balance and other data, a key-input unit 26 including the function buttons 11 to 17 and the keyboard 3, and a display unit 27 including the CRT 2. The receipt may be issued from the bank book printer 25. The banking transaction system 1 is controlled by a master slave system comprising a master central processing unit (hereinafter referred to as "M-CPU") 30 and a plurality of slave central processing units (termed "S-CPU") 31 to 35 for carrying out various transactions. Preferably such CPU's are microprocessors. The bank note dispenser 21 is controlled by the S-CPU 31, the bank note checker 22 by the S-CPU 32, the receipt issuing unit 23 and the card reader 24 by the S-CPU 33, the bank book printer 25 by the S-CPU 34, and the key-input unit 26 and the display unit 27 by the S-CPU 35. The M-CPU 30 and the S-CPU 31 to 35 are provided with read-only memories (ROM) 40 and 41 to 45 storing their programs and also with random access memories (RAM) 50 and 51 to 55 for storing various transaction data, respectively. The S-CPU 35 for controlling the display unit 27 is provided with a message illustration code memory 46 for storing codes representing predetermined procedure specifying messages and procedure specifying graphic illustrations to enable the CRT 2 to present various displays. The M-CPU 30 and S-CPU 31 to 35 are interconnected by an address bus, data bus and control bus. An unillustrated control center has a customer information file having stored therein customer's personal codes, banking transaction data, etc. By way of a transmission control unit 39, the M-CPU delivers transaction processing data to the control center, from which data permitting or rejecting a particular transaction and the transaction data renewed by the transaction concerned are fed to the M-CPU 30 via the unit 39. The transmission control unit 39 includes a line controller, modulator-demodulator, etc.

Figure 3:
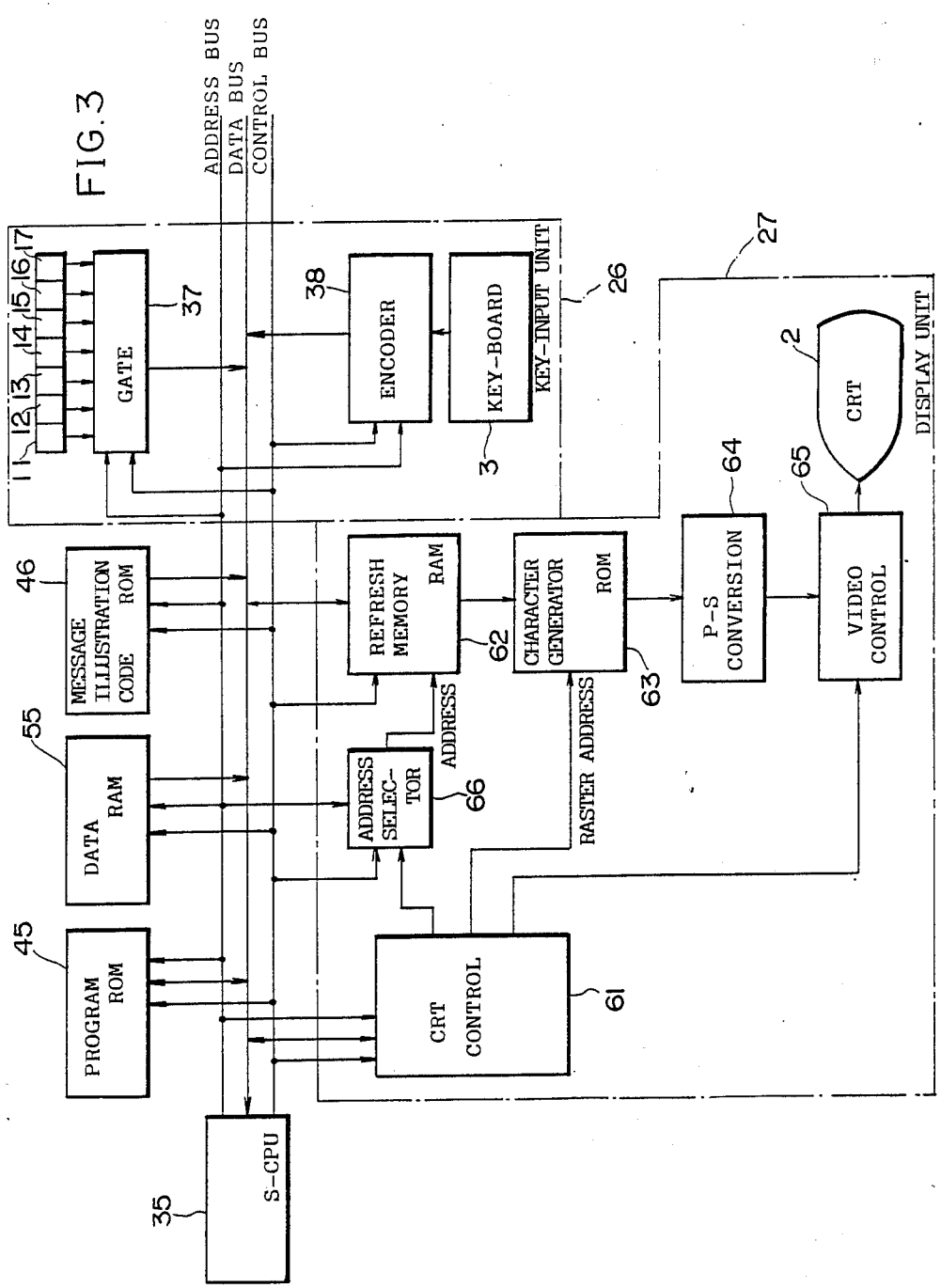
FIG. 3 is a block diagram showing a display unit of the system in detail.

FIG. 3 shows the key-input unit 26, display unit 27, etc. in greater detail. The key-input unit 26 comprises the function buttons 11 to 17, a gate 37 for feeding the output signals from the function buttons 11 to 17 to the S-CPU 35, the keyboard 3 and an encoder 38 by which the data entered by the keyboard 3 are converted and delivered to the S-CPU 35. The gate 37 permits the passage of the output signals only of the function buttons selected by the S-CPU 35. The display unit 27 comprises a CRT control unit 61, refresh memory 62, character generator 63, parallel-serial converter 64, video control unit 65 and address selector 66. The components of the display unit 27 will be described in greater detail later.

Displays on the CRT 2 are shown in FIGS. 7 to 18 for illustrative purposes. As will be apparent from these drawings, such displays comprise, individually or in combination a procedure specifying message, procedure specifying graphic illustration, term indicating the function of the function button, button frame and confirmation data.

Given below are examples of procedure specifying messages.

WELCOME TO OUR CONVENIENCE BRANCH. PRESS ONE BUTTON FOR DESIRED SERVICE. )M1

CASH IS WITHDRAWABLE WHEN YOUR CARD IS INSERTED WITHOUT PRESSING BUTTON (FIG. 7) )M2

INSERT YOUR CARD IN THE DIRECTION OF ARROW. (FIG. 8)

Figure 9:
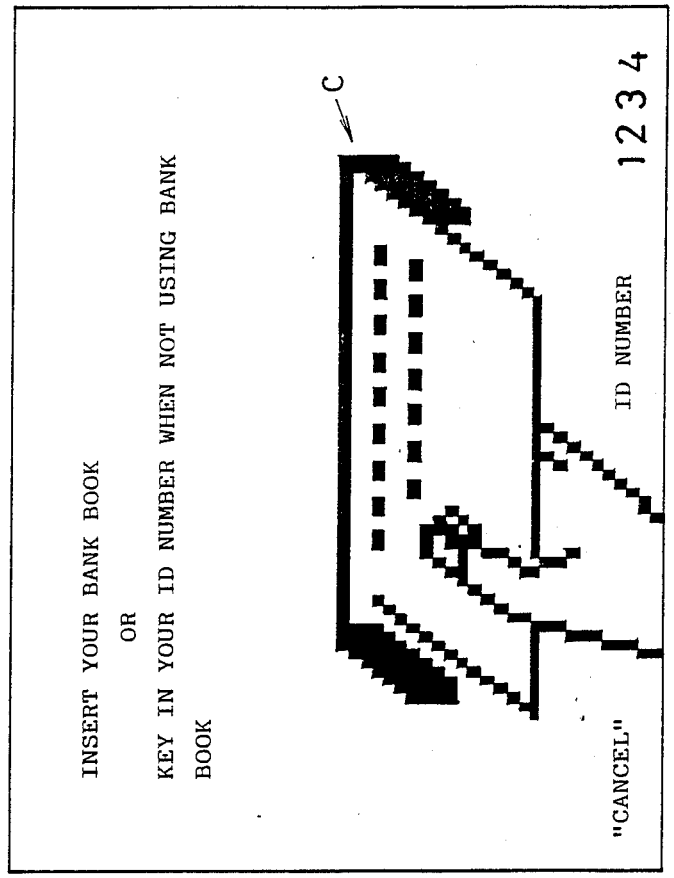

INSERT YOUR BANK BOOK, OR KEY IN YOUR ID NUMBER WHEN NOT USING BANK BOOK. (FIG. 9)

KEY IN YOUR ID NUMBER. (FIG. 10)

KEY IN AMOUNT OF CASH FOR WITHDRAWAL. (FIG. 11)

Exemplary of procedure specifying graphic illustrations the following.

Figure 17:
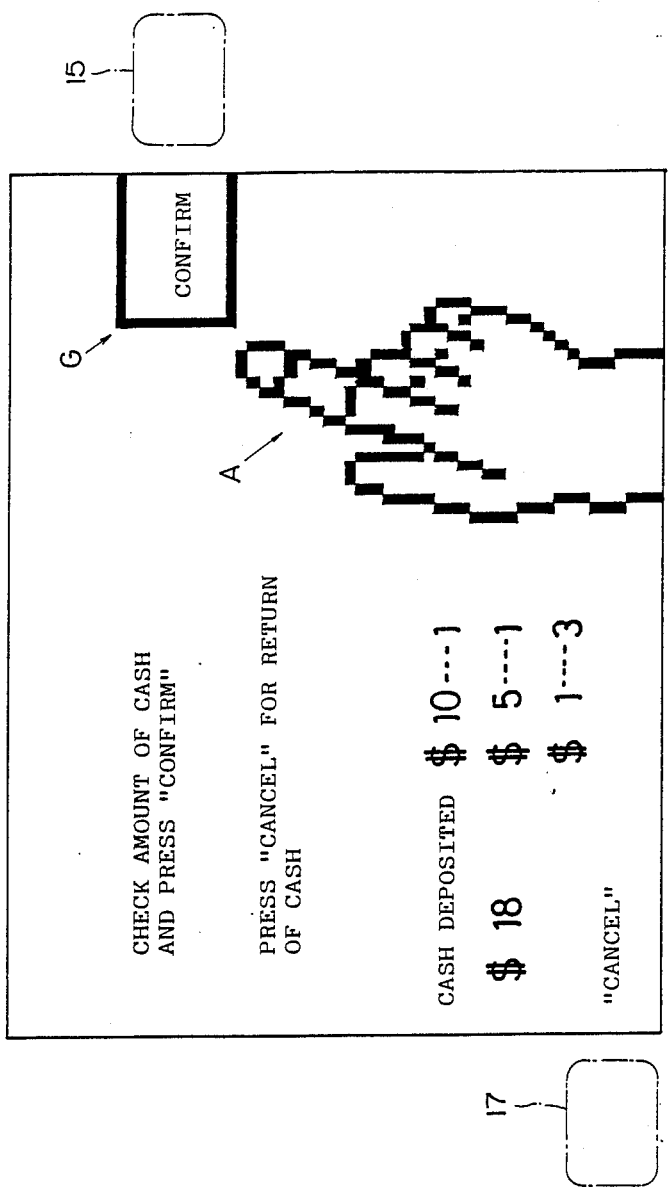

An illustration depicting the physical performance of the customer depressing one of the function buttons for selecting the desired transaction or confirming the sum (indicated at A in FIG. 7 or 17).

Figure 8:
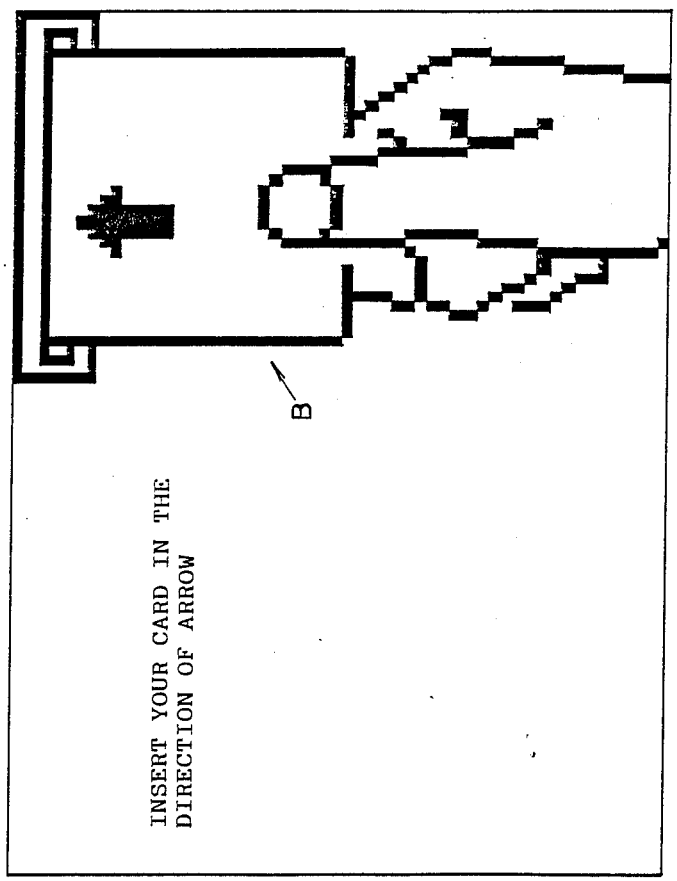
Figure 13:
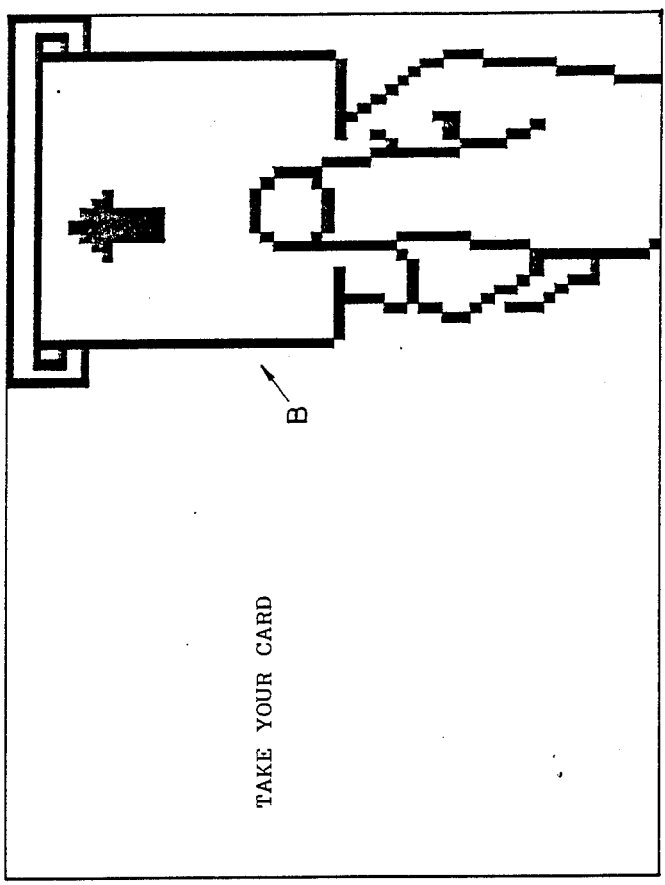

An illustration depicting the customer inserting or taking out a card (indicated at B in FIG. 8 or 13).

Figure 14:
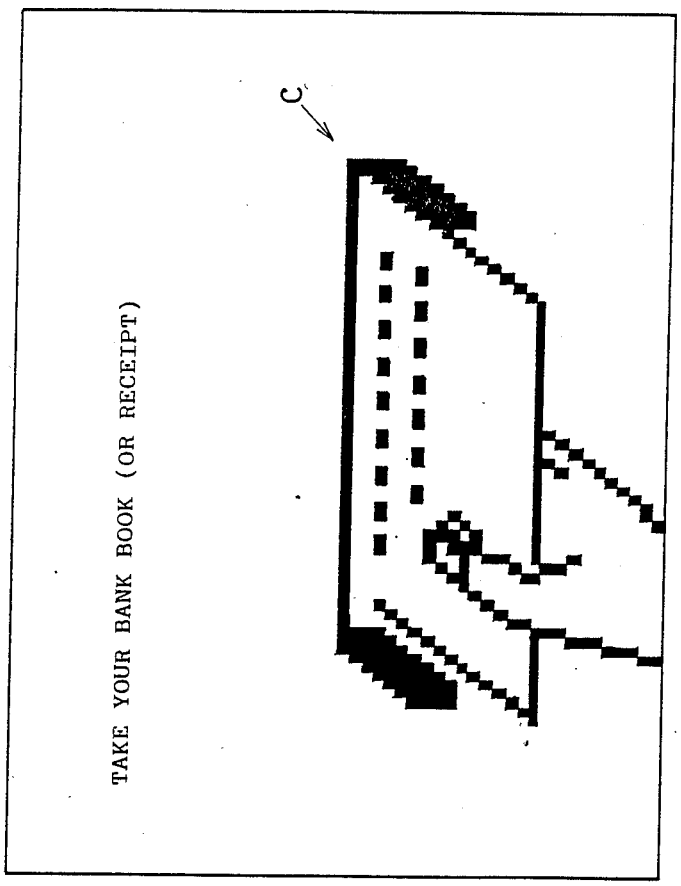

An illustration depicting the customer inserting or withdrawing a bank book (indicated at C in FIG. 9 or 14).

Figure 11:
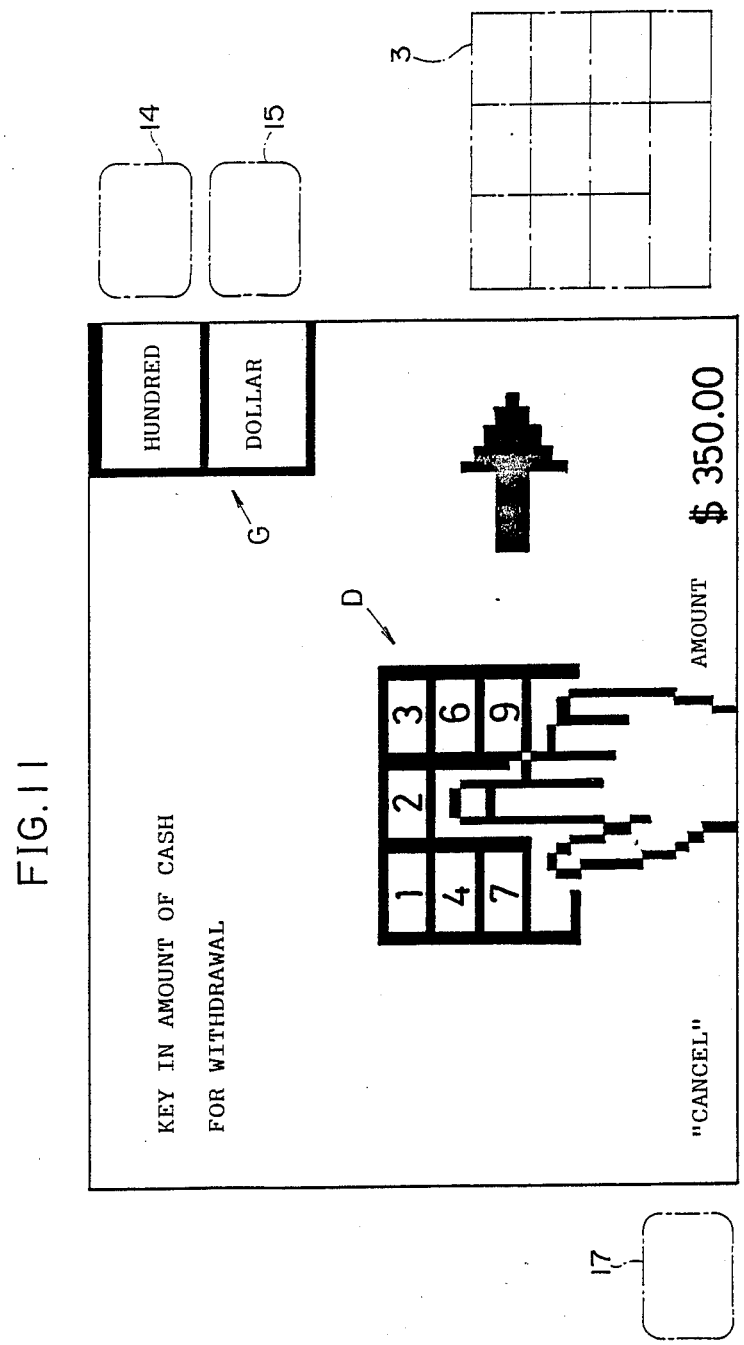

An illustration depicting the action of the customer entering by the keyboard his ID number or the sum to be withdrawn (designated at D in FIG. 10 or 11).

Figure 15:
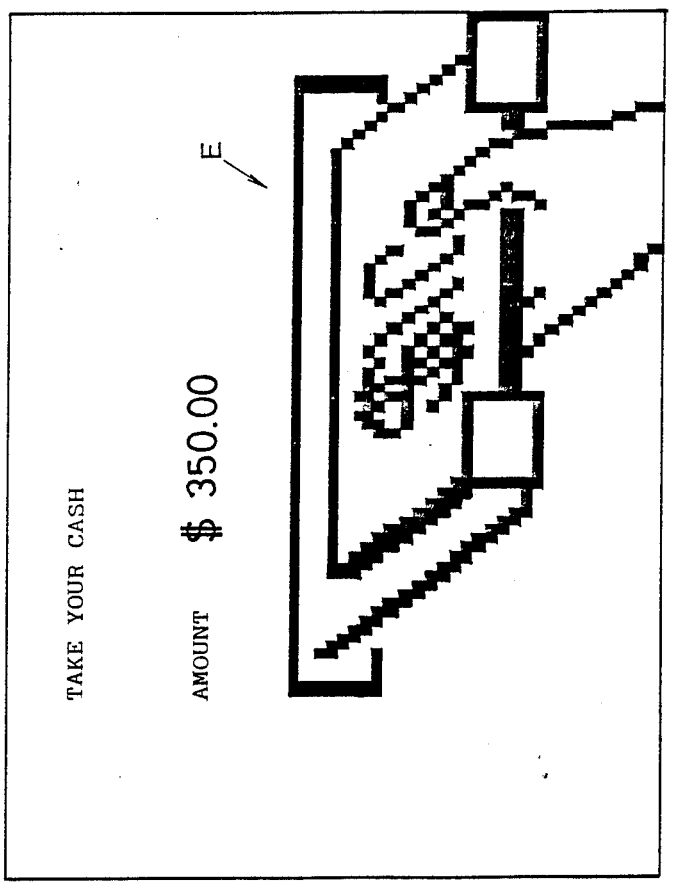

An illustration depicting the customer receiving cash (designated at E in FIG. 15).

Figure 16:
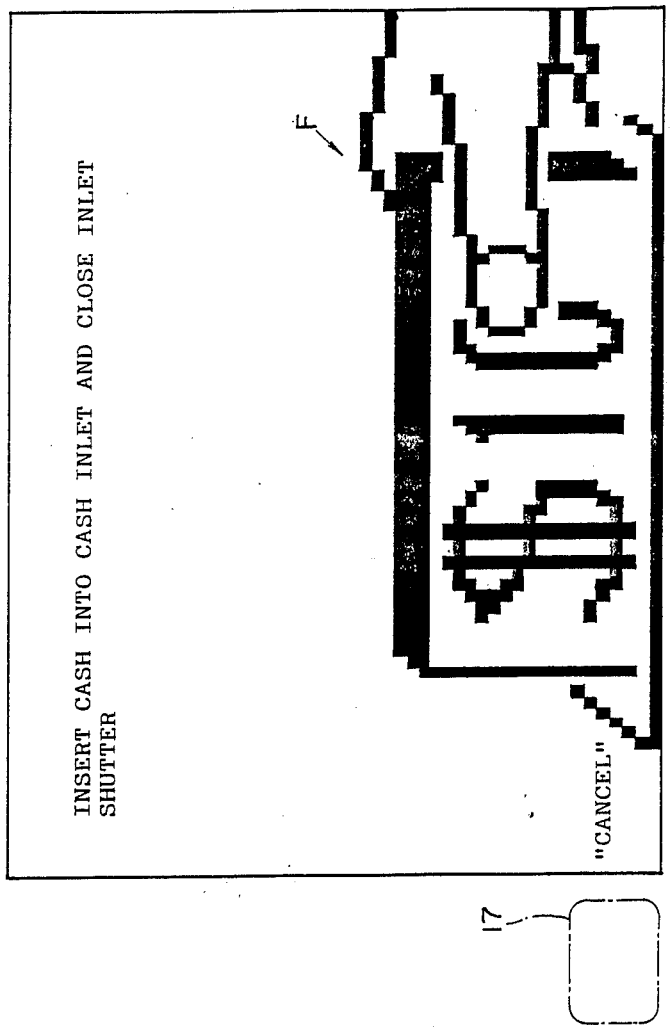
Figure 18:
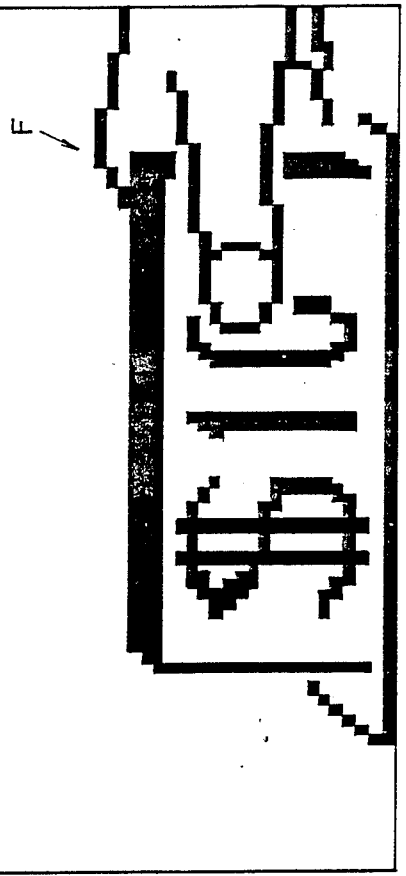

An illustration depicting the operation of the customer inserting or receiving bank notes (designated at F in FIG. 16 or 18).

It is understood that any of these procedure specifying graphic illustrations may, in fact, include at least a portion which is repetitively displayed sequentially in positions displaced from each other to provide a representation of motion, so as to dynamically depict the physical movements involved in performance of such functional operations as inserting, withdrawing, or pushing a button.

The function indicating terms showing the functions of the function buttons are displayed at locations adjacent the corresponding function buttons. When the customer is to specify the desired transaction, the terms, ENTRY, TRANSFER, EXCHANGE, WITHDRAWAL, DEPOSITING and BALANCE REFERENCE are displayed in corresponding relation to the buttons 11 to 16 (see FIG. 7). When the customer is to key in the sum to be withdrawn, the terms HUNDRED and DOLLAR are displayed in corresponding relation to the buttons 14 and 15 (FIG. 11). For example, when the sum to be dispensed to 350 dollars, the customer depresses the number 3 on the keyboard 3 first, then the button 14, thereafter the numbers 5 and 0 on the keyboard 3 in succession, and finally the button 15. For depositing, the sum of bank notes inserted into the inlet 4 is displayed on the CRT 2. For the customer to confirm that the displayed sum is in agreement with the sum of bank notes inserted, the customer uses the function button 15, the function of which is shown with the term "CONFIRM" displayed next to the button 15 (FIG. 17). In addition, function buttons are used for the exchange of money for specifying the kinds of notes desired by the customer, such as 1-dollar note, 2-dollar note and 5-dollar note. In this case, terms indicative of the face value of such notes are used as function indicating terms.

Figure 19:
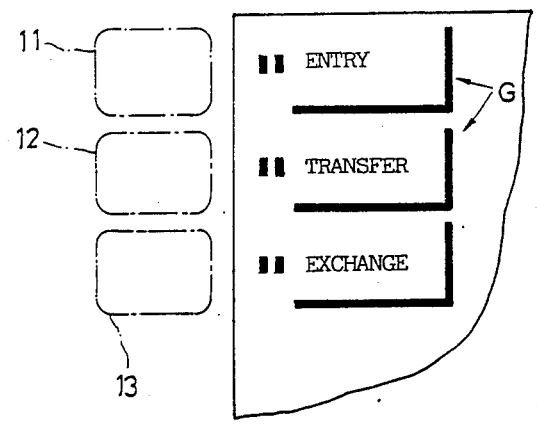
FIG. 19 shows another example of button frames.

The button frames are those indicated at G in FIGS. 7, 11 and 17 and surrounding the function indicating terms to manifestly show the buttons corresponding to the terms. The function button 17 is used for cancellation only (FIG. 9, etc.) In the present embodiment, the term "CANCEL" indicating the function of the button 17 is not provided with any button frame. As seen in FIG. 19, the button frame G may surround the term at least at two sides thereof.

Confirmation data are, for example, the sum of bank notes inserted, kinds of notes, number of notes, etc. as shown in FIG. 17.

The procedure specifying message, as well as the function indicating term, is composed of characters, such as letters and numerical figures. The character is shown on the screen of the CRT 2 as an assembly of bright dots. The character generator 63 produces an assembly of dots representing a character from a code representing the character. Similarly the procedure specifying graphic illustration, as well as the button frame, is composed of various segments e (to be referred to as "picture segments" for convenience) in combination, as shown in FIG. 7 for illustrative purposes. The picture segment e is also shown as an assembly of bright dots on the screen of the CRT 2. The assembly of dots forming the picture segment is produced also by the character generator 63.

Figure 4:
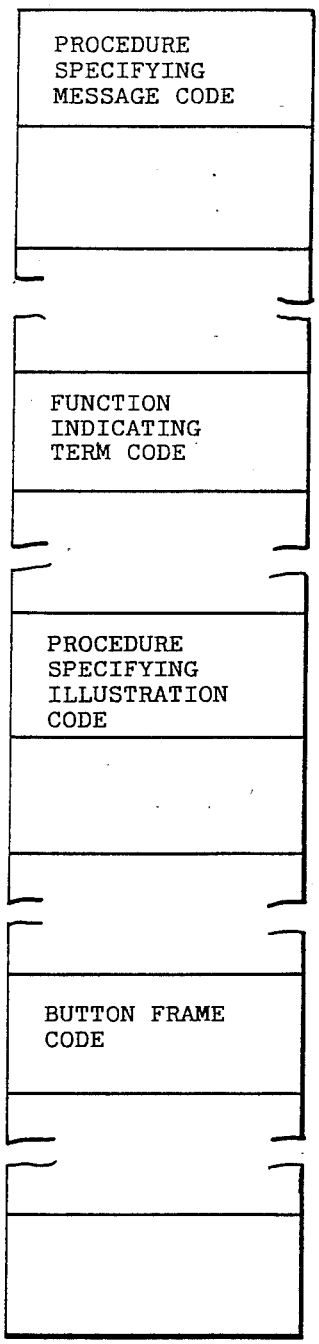
FIG. 4 shows the contents of message, term and illustration code memories.

FIG. 4 shows the contents of the message illustration code memory 46. Since the procedure specifying messages and function indicating terms are each composed of an assembly of characters, the memory 46 has stored therein the position (address) of each of the messages and terms on the screen of the CRT 2 and the codes of the characters constituting the same in the same order as in the message (or term). The same is true of the procedure specifying graphic illustrations and button frames; the memory 46 has stored therein the position (address) of each of the illustrations and frames on the screen of the CRT 2 and the codes of the picture segments constituting the same in a specific order.

When the M-CPU 30 gives an instruction to the S-CPU 35 for producing a display or image, the S-CPU 35 reads out the codes of the message (term) and/or illustration from the memory 46 in accordance with the instruction and stores the codes in the refresh memory 62. The refresh memory 62 includes a memory for storing the information for the first image and a memory for storing the information of the next image while the first image is on display. When the information of the first image has been stored, or is already stored, in the refresh memory 62, the CRT control unit 61 controls reading out of codes from the refresh memory 62 in response to an instruction from the S-CPU 35. The address selector 66 controls the refresh memory 62 in respect of the addresses for storing codes therein and reading out codes therefrom. Based on a code read out from the refresh memory 62, the address of an assembly of dots stored in the character generator 64 is specified. The CRT control unit 61 also feeds raster address signals to the character generator 63, which in turn generates dot signals representing characters or picture segments. The parallel-serial converter 64 converts the signals to serial video signals, which are fed to the video control unit 65. The unit 65 scans the video signals horizontally and vertically. The CRT control unit 61 reads out codes from the refresh memory 62 to bring the raster address signals into synchronism with the scanning of the video signals.

FIG. 5 shows the procedures to be followed by the customer for cash withdrawal, cash depositing, bank book entry and balance reference. The procedures for funds transfer and cash exchange are not shown. With use only of a card magnetically recording the personal code, etc., cash is withdrawn through steps 101 or 102 to 107. Steps 111 or 112 to 118 are for withdrawing cash with use of the card and a bank book. Steps 121 to 125 are for depositing with the card only, while steps 131 to 134 are for depositing with use of the bank book only. Usually the bank book has a magnetic strip affixed to its rear cover and recording the personal code and other data as is the case with the card, so that transactions can be executed with use of the bank book only. Steps 141 to 144 are for bank book entry with card and bank book. Steps 151 and 152 are for bank book entry with the bank book only. The term bankbook entry means printing of unrecorded new information on the bank book. Steps 161 and 162 are for balance reference with use of the card. When the card is inserted without selecting any other desired transaction by pressing the function buttons 11 to 16 (steps 101 and 111), cash is withdrawable.

Cash is withdrawn in the following manner using the card and the bank book. The customer depresses the function button 14 to specify withdrawal (step 100), and inserts the card into the inlet 6 (step 112). Alternatively the card is inserted without pressing the service select button (step 111). The customer then inserts the bank book into the inlet 9 (step 113) and enters his ID number by the keyboard 3 (step 114). When the ID number recorded in the card agrees with the ID number entered, cash is withdrawable. Subsequently the customer keys in the amount of cash to be withdrawn by the keyboard 3 (step 115), whereupon the banking transaction system 1 prepares communication data including the personal code or account number read from the card and the sum to be withdrawn (preprocessing) and starts communication with the control center. Based on the customer information file, the control center checks whether the sum is below the deposit balance and renews the file. In response to a dispensing instruction from the control center, the system 1 counts bank notes and prints the transaction data on the bank book and a receipt (post processing) and thereafter delivers the card to the inlet 6. The customer withdraws the card (step 116). The customer withdraws the bank book subsequently delivered to the inlet 9 (step 117), and takes the cash delivered to the outlet 8 (step 118). When cash is withdrawn with use of the card only without inserting the bank book, the receipt is withdrawn (step 106) instead of the withdrawal of the book.

The transaction of depositing includes the step (122 or 132) of inserting bank notes into the inlet 4 and the step (123 or 133) of checking whether or not the sum displayed on the CRT 2 is in agreement with the sum of the cash inserted. The system 1 checks the inserted bank notes for genuineness and kind with the bank note checker 22 and displays the amount of the inserted cash on the CRT 2.

For bank book entry and balance reference, the customer inserts the card (steps 141, 161), inserts the bank book (steps 142, 151), takes up the card (steps 143, 162) and withdraws the bank book (steps 144, 152), without inserting or receiving cash or without following other steps. For balance reference, the balance is displayed on the CRT 2.

FIG. 6 shows the procedure of cash withdrawal with use of the card and bank book to illustrate the relationships between the steps to be followed by the customer and the displays on the CRT 2. Before the transaction, the CRT 2 displays the image shown in FIG. 7. The CRT also displays the terms indicating the functions of the buttons 11 to 16 to be used for selecting the desired service, at locations adjacent the corresponding buttons, and further displays the frames G to clearly show the relationships between the buttons and the corresponding terms. Additionally the CRT displays the message instructing the customer to select the desired service by pressing one button and also displays the graphic illustration A depicting the depression of the button. A message is also given to the effect that the cash dispensing service is selected when the card is placed in without pressing the button.

When the customer depresses the desired button in accordance with the displayed instructions, the image on the CRT 2 changes to the one shown in FIG. 8. The screen now shows the message instructing the customer to insert the card and the graphic illustration B depicting the physical act of insertion of the card into the inlot.

Upon the insertion of the card into the card inlet 6, the CRT 2 displays the image shown in FIG. 9. FIG. 9 shows the message instructing the customer to insert the bank book and the graphic illustration C depicting the act of insertion of the book. Additionally, another instruction is also shown for entering the ID number by the keyboard 3 to withdraw cash with use of the card only without using the book. The ID number entered appears at the right lower corner of the screen.

Upon insertion of the book into the inlet 9, the image shown in FIG. 10 appears on the CRT 2. This image includes an instruction to enter the ID number and the graphic illustration D depicting this procedure. This illustration includes an arrow directed toward the keyboard 3, thus manifestly indicating the use of the keyboard. The ID number keyed in appears in the right lower corner of the screen.

When the ID number is entered, the image on the CRT 2 changes to the one shown in FIG. 11. The CRT 2 now displays the message instructing the customer to key in the sum of cash to be withdrawn and the above-mentioned illustration D. Since the function buttons 14 and 15 are used for entering the unit of the sum, the screen displays the terms "HUNDRED" and "DOLLAR" and button frames G surrounding the terms for the corresponding buttons. The amount of cash keyed in appears at the right lower corner of the screen. FIGS. 9 to 11 show the function indicating term "CANCEL" adjacent to the function button 17.

Figure 12:
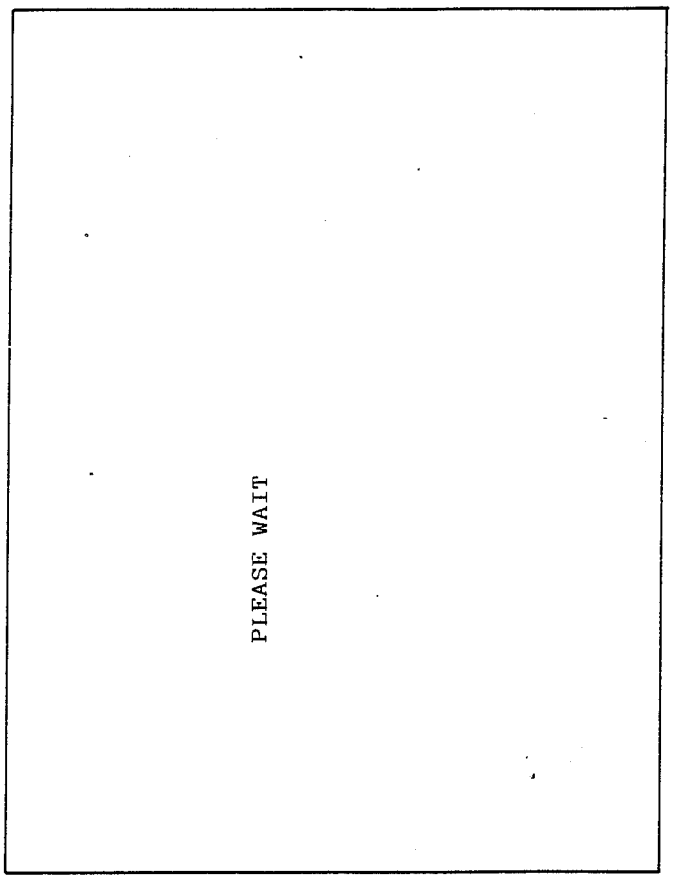

When the sum to be withdrawn is entered, the image on the CRT 2 changes to the one shown in FIG. 12. The image includes the instruction "PLEASE WAIT" since the system is in communication with the control center.

After the transaction data have been printed on the bank book and receipt following the communication with the control center, the CRT 2 shows the image of FIG. 13. The image includes the instruction to take the card and the graphic illustration B depicting withdrawal of the card.

When the customer takes the card from the inlet 6, the image on the CRT 2 changes to the one shown in FIG. 14. The image comprises the message instructing the customer to take the book or receipt and the illustration C depicting the withdrawal of the book.

Upon the withdrawal of the book or receipt from the inlet 9 or outlet 7, the CRT 2 displays the image comprising the message instructing the customer to take cash and the graphic illustration E depicting the withdrawal of the cash from the cash outlet 8. The amount of the cash is also shown. (See FIG. 15.)

FIG. 16 shows an image instructing the customer to insert into the inlet 4 the cash to be deposited. This image includes the instruction message and the graphic illustration F depicting this procedure. Following this instruction, the customer places cash into the inlet 4 (steps 122, 132).

FIG. 17 shows an image instructing the customer to confirm the sum of cash inserted, in comparison with the result displayed after the system has checked and counted the cash inserted. The image includes the message instructing the customer to press the "CONFIRM" button when the sum is in agreement with the count and the graphic illustration A depicting the depression of the button. The screen also shows the term "CONFIRM" indicating the function of the button 15 used for confirmation and disposed next to the button 15 and the button frame G surrounding the term. The term "CANCEL" is also displayed adjacent to the function button 17. When the customer confirms the result by pressing the button 15, the transaction proceeds to the next step. Even if the customer depresses some button other than the buttons 15 and 17, this produces no influence on the transaction.

When the customer presses the "CANCEL" button 17, the image on the CRT 2 changes to the one shown in FIG. 18, and the cash placed in is delivered to the return outlet 5. The screen shows the message instructing the customer to take the cash in the outlet and the graphic illustration F depicting the act of withdrawal of the cash from the return outlet.

Figure 20B:
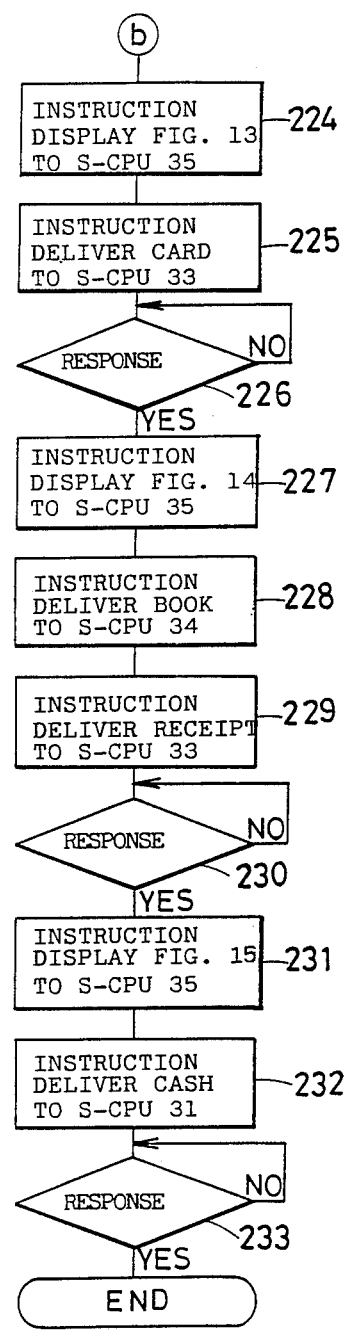

FIG. 20 shows a program executed by the M-CPU-30 for controlling the S-CPU for performing a transaction, especially cash withdrawal as an example of the transaction. A message including an instruction for displaying the image shown in FIG. 7 and a message including an instruction for inputting data which represents a depressed button of function buttons 11–16 (selected transaction by customer) are transmitted to the S-CPU 35 from the M-CPU 30 (steps 201 and 202). Further, a message including an instruction for reading the data on the card which is inserted by the customer to the S-CPU 33 which controls the card reader 24 (step 203). Then M-CPU 30 receives responses from the S-CPU 33 and 35 (step 204).

FIG. 21a shows a program performed by S-CPU 35 for controlling the key-input unit 26 and display unit 27. When the message from the M-CPU 30 is received (step 241), it is checked whether the message includes the instruction for displaying, the instruction for inputting or the others (steps 242 and 244).

Figure 21B:
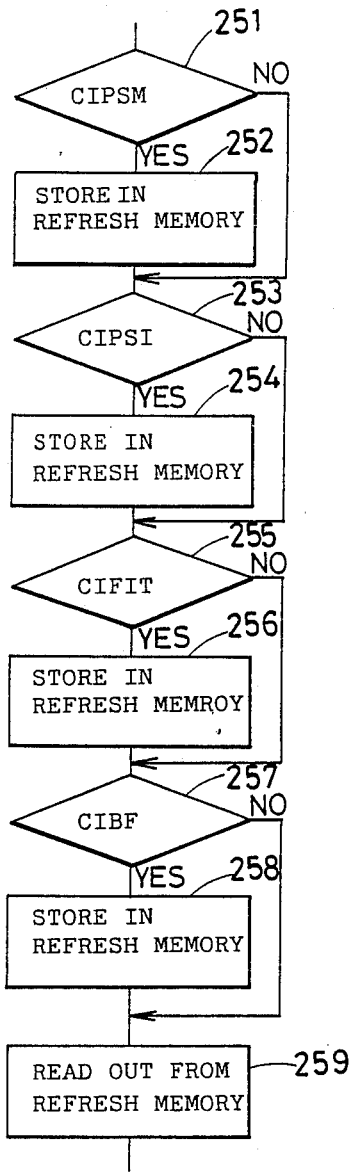

If displaying is instructed, a routine for displaying is executed by S-CPU 35 (step 243), which is shown in FIG. 21b. As mentioned above, the message for producing the display of FIG. 7 from M-CPU 30 includes codes for identifying procedure specifying messages (CIPSM) M1 and M2 and a code for identifying procedure specifying illustration (CIPSI) A, as well as other codes for identifying function indication terms (CIFIT) and button frames (CIBF). With reference to FIG. 21b, it is checked whether the message includes CIPSM, CIPSI, CIFIT and CIBF in series (steps 251, 253, 255 and 257). If CIPSM is included, then corresponding codes are read out from the message illustration code memory 46 and they are stored in the refresh memory 62 (step 252). Steps 254, 256 and 258 which are relating to CIPSI, CIFIT and CIBF respectively are the same routine as step 252. When the information of the image of FIG. 7 has been stored in the refresh memory 62, a command for reading out the codes from the refresh memory 62 is given to CRT control unit 61, address selector 66 and refresh memory 62 by S-CPU 35 (step 259).

If the message from the M-CPU 30 includes the instruction for inputting data, a routine for inputting is executed by S-CPU 35 (step 245), which is shown in FIG. 21c. With reference to FIG. 21c, the instruction is further analyzed as to whether it is for inputting signals from function buttons 11–17 or key board 3 (step 261). For example, since the instruction of step 202 in FIG. 20 is for inputting data as to compressed service select button (means function button 11–16), the gate 37 is controlled to permit the passage of output signals only of the function buttons 11–16 (step 262), and then the output signal from the depressed button selected by a customer inputs into the S-CPU 35 (step 263). Since the instruction of step 212 in FIG. 20 is for inputting ID number which is keyed in by key board 3 (NO for step 261), the ID number data is inputted into the S-CPU 35 after encoded by the encoder 38 (step 263). Keyed in data is edited as a response message (step 264) and is transmitted to M-CPU 30 (step 246). When no data is inputted even after predetermined time is over, a response message which includes no keyed in data is edited and transmitted to the M-CPU 30.

Figure 22:
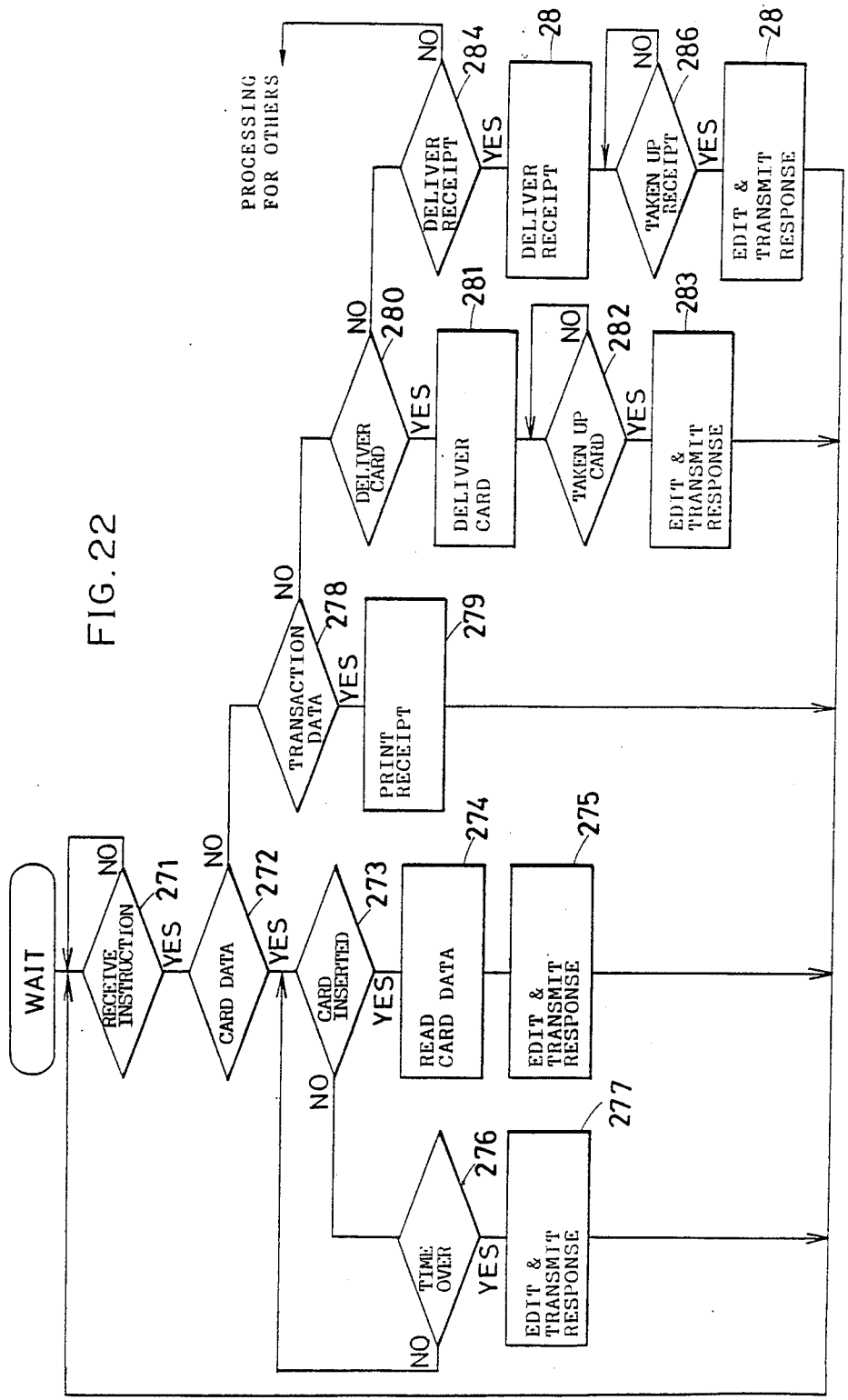

FIG. 22 shows a program executed by S-CPU 33 which controls the receipt issuing unit 23 and card reader 24. When the message from the M-CPU 30 is received (step 271), the message is checked to see whether it includes the instruction for reading the card data (step 272). If the instruction for reading the card data is included, then it is checked whether the card has been inserted into the inlet 6 and the card reader 24 (step 273). The insertion of the card is detected by the card reader (not shown) provided in the reader 24. With the card inserted, the card reader 24 reads the card data (step 274). The card data is edited in a response message and the message is transmitted to the M-CPU 30. When no card is inserted even after predetermined time is over, a response message which includes no card data is edited and transmitted to the M-CPU 30 (steps 276 and 277).

The customer will depress the desired button of function buttons 11–16 or insert the card (which means that the customer selects cash withdrawal) in accordance with the display of FIG. 7. Accordingly, the response messages in step 204 in FIG. 20 includes information concerning the selected transaction by the customer. The inclusion of card data in the message from S-CPU 33 means that customer specifies withdrawal, and next steps 207–209 are not necessary (step 205). When the message from the S-CPU 35 includes no card data, then the message from the S-CPU 35 is analyzed to see whether cash withdrawal is selected (step 206). When cash withdrawal is not selected, the message from S-CPU 35 is further checked to see what kind of transaction is selected.

When cash withdrawal is selected, next a message including an instruction for displaying the image shown in FIG. 8 is transmitted to the S-CPU 35 from the M-CPU 30 (step 207), and a message including an instruction for reading card data is transmitted to the S-CPU 33 from the M-CPU 30 (step 208). The image on the CRT 2 changes to one shown in FIG. 8 and the data on the card inserted by customer is read by the reader 24 in accordance with the instructions at steps 207 and 208 in the same manner as mentioned above. The M-CPU 30 receives a response which includes card data from S-CPU 33 (step 209).

Figure 23:
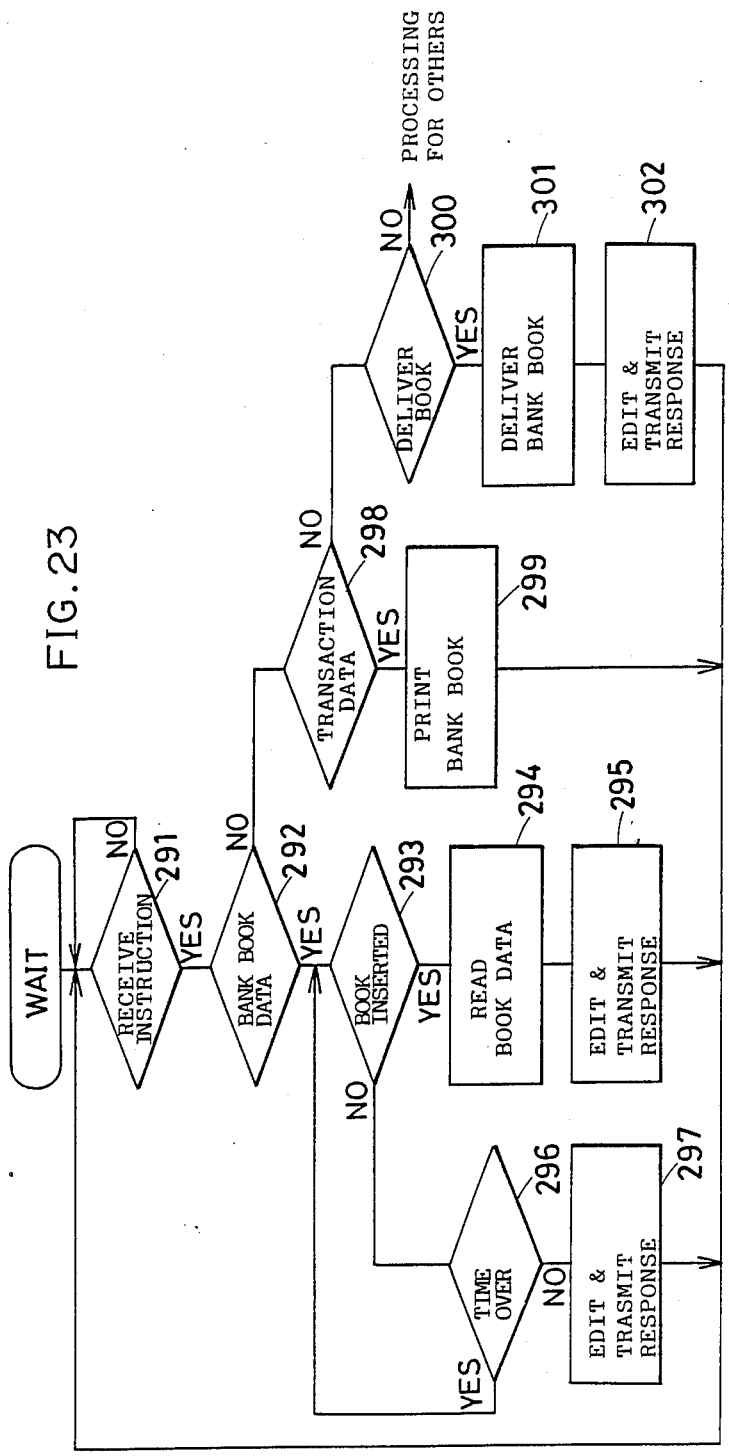

A message including an instruction for displaying the image shown in FIG. 9 and a message including an instruction for inputting ID number are transmitted to the S-CPU 35 from the M-CPU 30 (steps 210 and 212) and a message including an instruction for reading the bank book data is transmitted to the S-CPU 34 from the M-CPU 30 (step 211). The display of FIG. 9 is produced on the CRT 2 by the execution of steps 241–243 (including steps 2510259 in FIG. 21b) in FIG. 21a. The ID number entered by the customer when he does not use the bank book is input and sent to the M-CPU 30 by the M-CPU 35 executing the steps 244–246 (including steps 261, 262 and 263 in FIG. 21c) in FIG. 21a. Also the bank book data is read by the S-CPU 34 and is transmitted to the M-CPU 30. The program of the S-CPU 34 is shown in FIG. 23. The operations of steps 291–297 in FIG. 23 are the same as those of steps 271–277 in FIG. 22 except that data on the magnetic strip affixed to the bank book is read by a magnetic reader (not shown) which is provided in the bank book printer 25 in step 294. A bank book detector (not shown) which detects the insertion of the bank book is also provided in the printer 25 for the step 293.

Upon the receiving of the response message from the M-CPU 34 or 35 by the S-CPU 30 (step 213 in FIG. 20), the message is checked to see whether it includes data of ID number (step 214). If the message from the S-CPU 35 has ID number, the next steps 215–217 need not be performed.

When the response message from the S-CPU includes bank book data, then a message including an instruction for displaying the image shown in FIG. 10 and a message including an instruction for inputting ID number are transmitted to the S-CPU 35 from the M-CPU 30 (steps 215 and 216). Upon the receipt of the messages by the S-CPU 35, the display of FIG. 10 appear on the CRT 2 and ID number is input into the S-CPU 35, ID number being entered by the customer, and ID number is sent to the M-CPU 30.

When the M-CPU 30 receives the response message having ID number (step 217), the M-CPU 30 further sends a message including an instruction for displaying the image of FIG. 11 and a message including an instruction for inputting the sum of cash to be withdrawn to the S-CPU 35 (steps 218 and 219).

Upon the receipt of these instructions by S-CPU 35, the image on the CRT 2 changes to one shown in FIG. 11 and the sum entered by the customer is transmitted to the M-CPU 30.

When the M-CPU 30 receives the response message having the sum from the S-CPU 35 (step 220), then an instruction for displaying the image of FIG. 12 is sent to the S-CPU 35 (step 221). As the result of that, the image on the CRT 2 changes to the one shown in FIG. 12. And then the M-CPU starts communicating with the control center (step 222).

After the M-CPU 30 has received the transaction data by the communication with the center, the M-CPU 30 sends the transaction data to the S-CPU's 31, 33 and 34 (step 223). In FIG. 22, when the S-CPU 33 receives the message including transaction data (step 278), the data is printed on the receipt by the receipt issuing unit 23 (step 279). In FIG. 23, the data is printed on the bank book by the bank book printer 25 (step 299).

Figure 24:
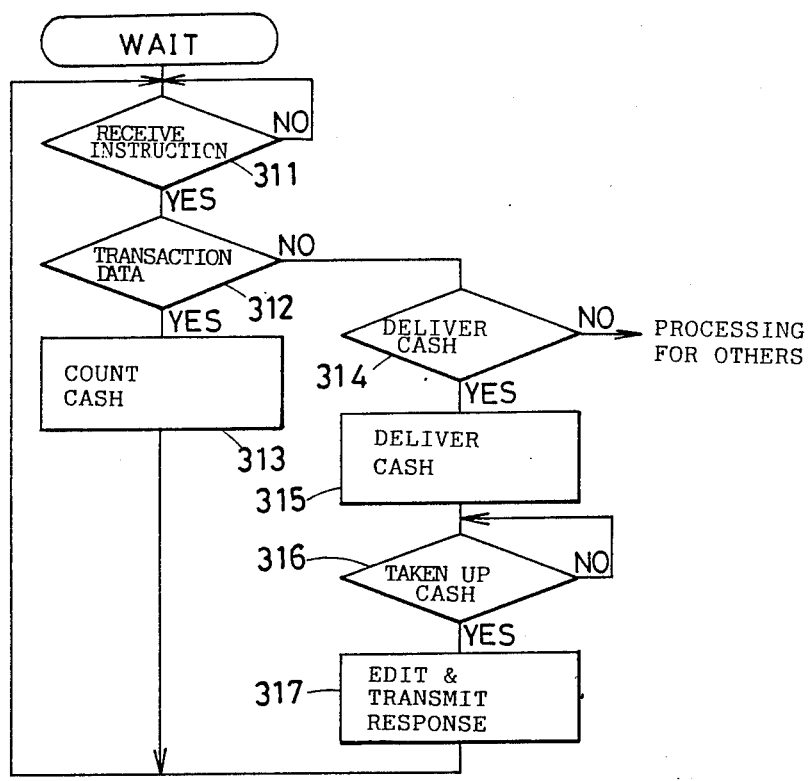

FIG. 24 shows a program of the S-CPU 31 which has the bank note dispenser 21. When the message from M-CPU 30 is received (step 311), it is checked whether the message contains the transaction data (step 312). When the transaction data is included in the message, cash is drawn out from a cash box (not shown) and counted up to the sum to be withdrawn and the counted cash is temporarily held (step 313).

With reference to FIG. 20, then a message including the instruction for displaying the image shown in FIG. 13 is transmitted to the S-CPU 35 and a message including an instruction for delivering the card is transmitted to the S-CPU 33 from the M-CPU 30 (steps 224 and 225). Upon receipt of the message by the S-CPU 35, the CRT 2 shows the image of FIG. 13.

In FIG. 22, when it is confirmed that the instruction of the message is for delivering the card (step 280), the card is delivered to the inlet (step 281). When the delivered card is taken up by the customer (step 282), then a message which includes a report that the card has been taken up is edited and transmitted to the M-CPU 30 (step 283).

After the message from the S-CPU 33 is received (step 226) in FIG. 20, an instruction for displaying the image of FIG. 14 is sent to the S-CPU 35 (step 227). As the result of that, the image on the CRT 2 changes to the one shown in FIG. 14. Also, a message including an instruction for delivering the bank book to S-CPU 34 and a message including an instruction for delivering the receipt to S-CPU 33 are transmitted from M-CPU 30 (step 228, 229). With reference to FIG. 23, upon receiving the instruction for delivering the bank book (step 300), the bank book with the transaction data printed on is delivered to the inlet 9 (step 301), and thereafter a message including a response that the book has been delivered is edited and transmitted to the M-CPU 30 (step 302). In reference to FIG. 22, when the instruction for delivering the receipt is received, the receipt is delivered and a response message is sent to the M-CPU 30 (steps 284–287) in the same manner as in the case of the card (steps 280–283).

After the M-CPU 30 receives the messages from S-CPU's 33 and 34 (step 230 in FIG. 20), the M-CPU 30 sends an instruction for displaying the image of FIG. 15 to the S-CPU 35 (step 231). As the result of that, the CRT displays the image shown in FIG. 15. A message including an instruction for delivering cash is also sent to the S-CPU 31 (step 232).

In FIG. 24, when the S-CPU 31 receives the message (step 314), cash which is temporarily held is delivered to the outlet 8 (step 315). After it is confirmed that the customer takes up cash (step 316), a response message having the confirmation is transmitted to the M-CPU 30 (step 317), and the M-CPU 30 receives the response message (step 233 in FIG. 20.)

From the beginning it will be seen that a transaction system embodying the present invention is operative to provide banking customers not only with textual messages describing the operation of the system, but also with graphic illustrations that pictorially depict the actual physical enactment of the procedure, thereby providing more understandable operating instructions even without reference to the textual message. This enables those customers who are unfamiliar with the system, who have difficulty in reading textual messages, or who do not relate well to written instructions, to much more rapidly perform their desired banking transactions. As a result, greater customer satisfaction is obtained, and more efficient use of the transaction system to perform a greater number of transactions in a given period of time provides economies in the number of transaction terminals required.

Although the invention has been described with reference to the preferred embodiment shown in the drawings and described in the specification, it is apparent that this embodiment may be modified in various ways within the scope of the following claims.

We claim:

1. A transaction performing system for executing, upon operation by a customer, one of a plurality of predetermined banking transactions, each of said transactions comprising a plurality of sequential steps required to be executed in order by said customer and requiring the performance of a physical manipulative procedure by said customer,
   said system comprising a console having mounted therein an electronic visual display unit and a plurality of physically manipulative functions units required to be operated selectively by said customer;
   display control means operatively connected to said display unit;
   means for causing said display control means to present on said display unit, simultaneously, a procedure specifying selected transaction and a procedure specifying graphic illustration that both visually indicates the proper function unit to be manipulated and pictorially depicts the physical manipulative procedure to be performed by said customer to execute said step; and
   wherein said function units include an input unit for receipt of an object to be inserted into said console and an output unit for delivery of an object to be withdrawn from said console; and
   wherein said procedure specifying textual message directs the insertion of an object into said input unit, and said procedure specifying graphic illustration pictorially depicts the insertion of such an object into said input unit; and
   wherein said graphic illustration pictorially depicts a human hand inserting said object into said input unit.

2. A transaction performing system as claimed in claim 1 wherein said object is one that might be involved in a banking transaction, such as a bank book, bank card, or cash.

3. A transaction performing system for executing, upon operation by a customer, one of a plurality of predetermined banking transactions, each of said transactions comprising a plurality of sequential steps required to be executed in order by said customer and requiring the performance of a physical manipulative procedure by said customer,
   said system comprising a console having mounted therein an electronic visual display unit and a plurality of physically manipulative functions units required to be operated selectively by said customer;
   display control means operatively connected to said display unit;
   means for causing said display control means to present on said display unit, simultaneously, a procedure specifying selected transaction and a procedure specifying graphic illustration that both visually indicates the proper function unit to be manipulated and pictorially depicts the physical manipulative procedure to be performed by said customer to execute said step; and
   wherein said function units include an input unit for receipt of an object to be inserted into said console and an output unit for delivery of an object to be withdrawn from said console; and
   wherein said procedure specifying textual message directs the withdrawal of an object from said output unit, and the procedure specifying graphic illustration pictorially depicts the withdrawal of such an object; and
   wherein said graphic illustration pictorially depicts a human hand receiving said object from said output unit.

4. A transaction performing system as claimed in claim 3 wherein said object is one that might be involved in a banking transaction, such as a bank book, bank card, bank notes, or transaction receipt.

* * * * *